United States Patent [19]

Sandkuhler

[11] Patent Number: 5,099,221

[45] Date of Patent: Mar. 24, 1992

[54] INDUCTIVE LOAD WEIGHT SENSOR FOR CONTROLLING BRAKE AND AUDIBLE ALARM

[75] Inventor: Georg Sandkuhler, Hemer, Fed. Rep. of Germany

[73] Assignee: Edelhoff Polytechnik Gmbh & Co., Fed. Rep. of Germany

[21] Appl. No.: 750,435

[22] Filed: Aug. 20, 1991

Related U.S. Application Data

[63] Continuation of Ser. No. 439,546, Nov. 21, 1989.

[30] Foreign Application Priority Data

Nov. 28, 1988 [DE] Fed. Rep. of Germany ....... 3840112

[51] Int. Cl.$^5$ .............................................. G08B 21/00
[52] U.S. Cl. .................................. 340/440; 340/613; 340/666; 340/686
[58] Field of Search ............. 116/28 R; 364/281, 283, 364/463; 340/666, 613, 686, 440; 303/22.1, 22.2, 22.3, 22.4, 22.5, 22.6, 22.7, 22.8; 177/136–141

[56] References Cited

U.S. PATENT DOCUMENTS

| | | | |
|---|---|---|---|
| 1,168,370 | 1/1916 | Anderson | 340/440 |
| 3,531,766 | 9/1970 | Henzel | 340/440 |
| 3,634,635 | 1/1972 | Ellis | 200/84 C |
| 3,955,636 | 5/1976 | Askew | 177/137 |
| 3,973,804 | 8/1976 | Engfer et al. | 303/2 |
| 4,050,743 | 9/1977 | Knight | 303/22.7 |
| 4,553,788 | 11/1985 | Smith | 303/22.5 |
| 4,691,792 | 9/1987 | Shintani | 364/463 |
| 4,727,352 | 2/1988 | Doller | 340/665 |
| 4,856,098 | 8/1989 | Morra | 324/207.16 |
| 5,032,821 | 7/1991 | Domanico et al. | 340/440 |

FOREIGN PATENT DOCUMENTS

| | | |
|---|---|---|
| 339146 | 10/1977 | Austria . |
| 1212418 | 7/1986 | Canada . |
| 0062246 | 10/1982 | European Pat. Off. ........... 303/22.1 |
| 927071 | 4/1955 | Fed. Rep. of Germany . |
| 2356914 | 1/1978 | France . |

OTHER PUBLICATIONS

Japan-Patent Abstracts of Japan, vol. 6, No. 88 P-118 (966) of 5/26/82, Kimoto.
European Search Report of 5/30/90.

*Primary Examiner*—Edward L. Coles, Sr.
*Assistant Examiner*—Jill Jackson
*Attorney, Agent, or Firm*—Morgan & Finnegan

[57] ABSTRACT

In an apparatus for indicating the load on trucks, particularly the weight of the useful load which has been picked up by garbage collecting, which trucks have a frame which is movable relative to the axles and is supported on the axles by springs, a device is provided which detects the distance between the frame of the truck and the axle or axles. The device is arranged to produce a signal when the distance has been reduced to an extent which corresponds to the weight of the highest permissible useful load.

4 Claims, 1 Drawing Sheet

INDUCTIVE LOAD WEIGHT SENSOR FOR CONTROLLING BRAKE AND AUDIBLE ALARM

This is a continuation of co-pending application Ser. No. 07/439,546, filed on Nov. 21, 1989, now abandoned.

BACKGROUND OF THE INVENTION

1. Field of the Invention

This invention relates to an apparatus for indicating the loading of trucks, particularly the weight of the useful load which has been picked up by garbage collecting trucks, which trucks have a frame which is movable relative to the axles and is supported on the axles by springs.

2. Description of the Prior Art

When trucks are being loaded, a loading in excess of the highest permissible total weight can usually not be avoided unless the weight of the load is known. However, the weight of the load is not known in many cases so that only a coarse estimate of the total weight can be made and the total weight may often exceed the highest permissible total weight or may be much lower than said the highest permissible weight so that the capacity of the truck is not fully utilized.

The desire to estimate the load in order to avoid overloading and to ensure optimum utilization of the load capacity arises particularly in connection with garbage collecting trucks which are loaded by emptying the contents of garbage cans into the truck and the driver cannot estimate the total weight of the garbage which has been picked up. If the truck moves to a dump before the highest permissible total weight has been reached, this means that the load capacity of the truck is not fully utilized. This is uneconomical. On the other hand, if the load exceeds the load capacity, this may result in risks due to overloading, the roads may be soiled by garbage falling from the truck and the braking and hydraulic systems of the truck may be overloaded.

SUMMARY OF THE INVENTION

Accordingly, it is an object of the invention to provide a structurally simple apparatus which is of the kind described first hereinbefore and which will indicate to the driver that the highest permissible total weight has been reached.

In an apparatus of the kind described first hereinbefore that object is accomplished in accordance with the invention in that a device is provided which detects the distance between the frame of the truck, on the one hand, and the axle or axles, and the device is arranged to produce a signal when the distance has been reduced to an extent which corresponds to the weight of the highest permissible useful load. The apparatus in accordance with the invention is distinct and particularly simple in structure since the spring suspension of the truck is utilized for an evaluation of the loading.

Trucks are usually provided with a linkage, which depending on the load-dependent movement of the spring-suspended frame relative to the axles of the truck, controls a loaddependent brake. In accordance with a preferred feature of the invention, an actuating member is connected to the linkage for applying the load-dependent brake and the actuating member operates or activates an initiator when the distance between the frame of the truck, on the one hand, and the axle or axles, on the other hand, has been reduced to an extent which corresponds to the weight of the highest permissible useful load.

The actuating member suitably consists of a sheet metal element or the like, which cooperates in a noncontacting manner with an inductive initiator. Such an apparatus will not be affected by dirt.

In accordance with a further feature of the invention the activated initiator closes an indicating circuit when the brake of the truck has been applied. In such a case the indication will be more reliable because the truck will be at a standstill when the brake has been applied so that dynamic influences, which might be due to an oscillation of the frame of the truck or to impacts on the axles, cannot occur.

DETAILED DESCRIPTION OF THE PREFERRED EMBODIMENT

Figure 1:
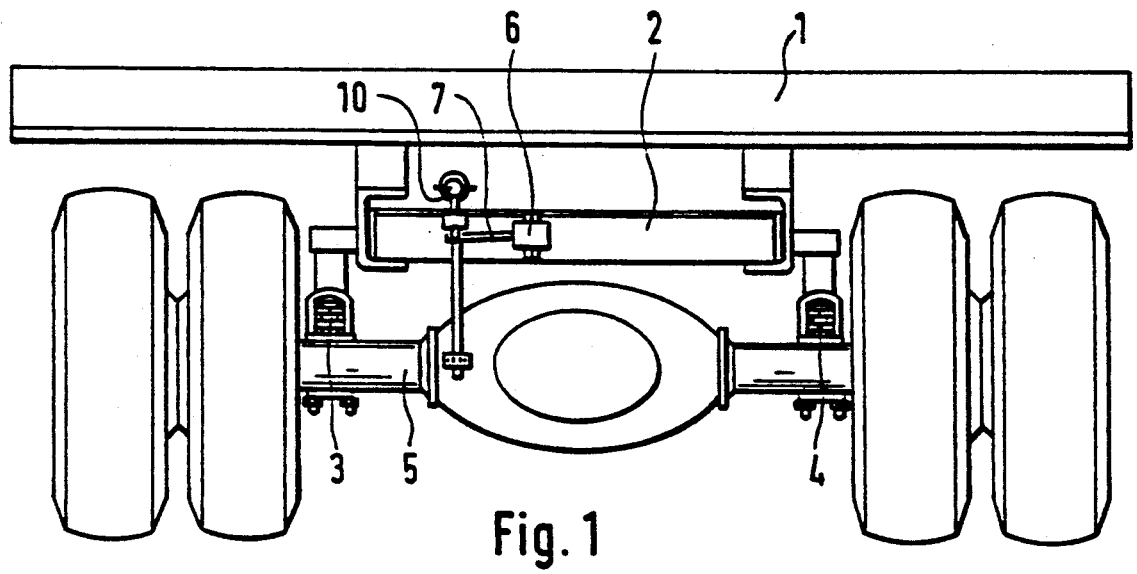
FIG. 1 is a rear elevation of a frame of a truck which frame is supported on the rear axle.
Figure 2:
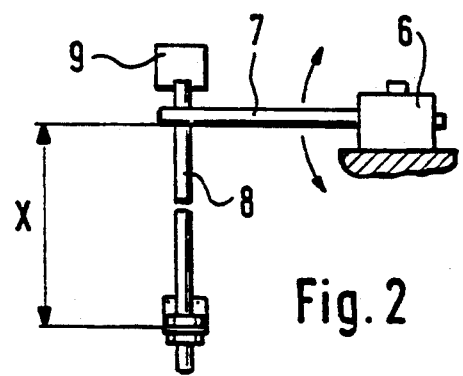
FIG. 2 is an enlarged view showing the linkage for applying the load-dependent brake.

An illustrative embodiment of the invention will now be explained more in detail with reference to the drawings.

The frame 2 of a truck carries the body of the truck or the loading platform 1 and in a conventional manner, which is not described more in detail, is supported on the axle 5 of the truck by sets of leaf springs 3, 4. When a load is applied to the loading platform 1 of the truck, the distance between the frame 3 of the truck and the axle 5 will be reduced depending on the weight of the useful load which has been recieved.

A regulating valve 6 is secured to the frame 2 of the truck and controls the braking pressure which can be applied to the pneumatic brakes associated with the rear axle. The regulating valve 6 is provided with a pivoted adjusting lever 7, which is pivoted at its free end to the top end of a rod 8. The bottom end of the rod 8 is secured to the axle 4 and particularly to the housing of the differential of the rear axle. As a result, the rod 8 will be pivotally moved in response to a decrease or increase of the distance between the frame 2 of the truck and the pivot of the adjusting lever 7 of the regulating valve 6 and will thus adjust the correct braking pressure depending on the load.

A sheet metal element 9 is connected to the top end of the rod 8 and cooperates with the inductive initiator 10, which is secured to the frame 2 of the truck and is adjustable in height. As soon as the sheet element 9 enters the range in which the initiator 10 is responsive, the change of the inductance will cause the initiator to generate a signal, that is by closing a circuit.

Figure 3:
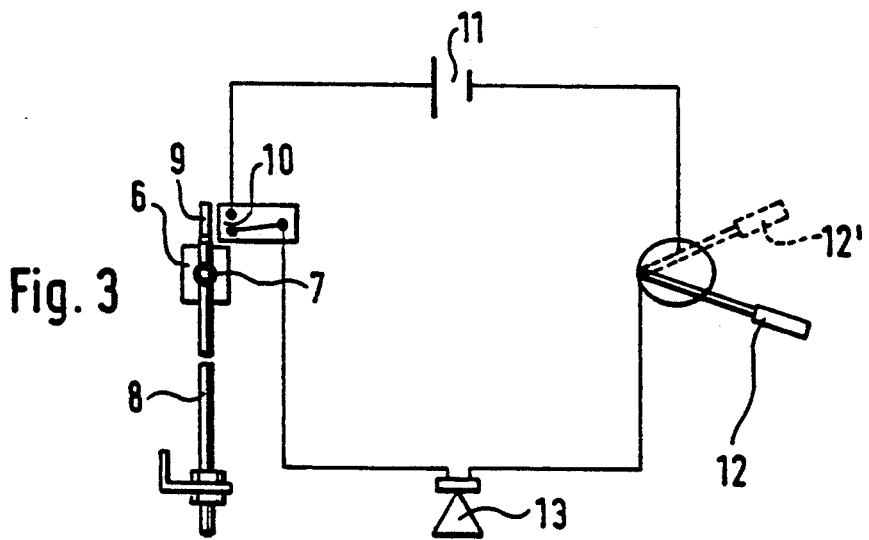
FIG. 3 is a circuit diagram showing the circuit for indicating the total weight with reference to the highest permissible total weight.

As is apparent from FIG. 3, the initiator 10 is included in a circuit which is energized by the battery 11 of the truck. That circuit will be closed when the initiator 10 and the hand brake 12. When the circuit is closed, a signal generator 13 which is included in the circuit is fed with the signal current which is required for an indication. The circuit will be closed by the hand brake 12 when the hand brake is moved to its applied position 12', which is indicated in dotted lines.

The initiator 10 is so adjusted that the range in which the initiator 10 is responsive will be entered by the sheet metal element 9 when the highest permissible useful load has been applied to the truck and the spring-suspended frame of the truck has been displaced a corresponding distance.

When the initiator 10 has been adjusted to an initial setting, an exact indication will be ensured because during the brake inspection which is prescribed by law every half-year the effective length X of the rod 8 of the linkage which is connected to the load-dependent brake can be re-adjusted, if desired.

The distance between the frame 2 of the truck and the axle 5 depends on the distance of movement of the spring-suspended frame 2 and can alternatively be utilized for an indication of the load or of the total weight which is equal to the highest permissible total weight by means of different transmitting means and switches.

I claim:

1. Apparatus for indicating the weight of the useful load on a truck having a frame and an axle, said frame being movable relative to said axle and supported on said axle by springs, and a distance detecting device located in the vicinity of said frame and said axle which detects the distance between said frame and said axle and produces a signal through a signal generator in a circuit connected to an initiator when the distance between said frame and said axle has been reduced to an extent corresponding to the weight of the highest permissible useful load, said distance detecting device comprising a linkage secured to said axle and to said frame, through a rod secured to said axle at one end and which has a lengthwise adjustable actuating member connected thereto at the other end and a regulating valve connected to said frame and to said rod by an adjusting lever connected at one end to said regulating valve and pivoted at other end to said rod in the vicinity of said actuating member, said distance detecting device controlling a load dependent hand brake on said truck depending on the distance of movement of said frame relative to said axle, and said lengthwise adjustable actuating member operating and activating said initiator to close said circuit connected thereto and to said hand brake and a battery of said truck and to said signal generator when the distance between said frame and said axle has been reduced to the weight of the highest permissible useful load.

2. Apparatus according to claim 1 wherein the actuating member is a sheet metal element and the initiator is an inductive initiator, said actuating member being movable towards and away from the vicinity of said initiator and activating said initiator without physical contact therewith.

3. Apparatus according to claim 1 wherein the circuit is closed by the initiator when the distance between the frame and the axle of the truck has been reduced to the weight of the highest permissible load.

4. Apparatus according to claim 1 wherein the circuit is closed by the initiator when the distance between the frame and the axle of the truck has been reduced to the weight of the highest permissable load when the hand brake on the truck has been applied and the truck is in a stationary position.

* * * * *